United States Patent [19]
Mori et al.

[11] Patent Number: 5,899,524
[45] Date of Patent: May 4, 1999

[54] SLIDING ROOF ASSEMBLY

[75] Inventors: Keiji Mori, Kariya; Hiroyuki Yano, Aichi-ken, both of Japan

[73] Assignee: Aisin Seiki Kabushiki Kaisha, Japan

[21] Appl. No.: 08/772,117

[22] Filed: Dec. 20, 1996

[30] Foreign Application Priority Data

Dec. 28, 1995 [JP] Japan .................................. 7-352374

[51] Int. Cl.[6] ............................................. B60J 7/053
[52] U.S. Cl. ........................ 296/222; 296/223; 296/224
[58] Field of Search ................................. 296/221–224

[56] References Cited

U.S. PATENT DOCUMENTS

| 4,364,601 | 12/1982 | Katayama | 296/221 |
| 4,673,210 | 6/1987 | Boots | 296/221 |
| 4,877,285 | 10/1989 | Huyer | 296/223 X |

FOREIGN PATENT DOCUMENTS

| 4-243623 | 8/1992 | Japan . | |
| 4-243624 | 8/1992 | Japan | 296/221 |

*Primary Examiner*—Dennis H. Pedder
*Attorney, Agent, or Firm*—Finnegan, Henderson, Farabow, Garrett & Dunner

[57] ABSTRACT

A sliding roof assembly includes a bracket for supporting a sliding panel, a rear lift link disposed between the bracket and a driving rear shoe, a front lift link disposed between the bracket and a driven front shoe, a check block for transmitting a rear driving force, after the lowering of the rear portion of the bracket, to the driven front shoe, and a front member, so arranged as to be movable independently of the driven front shoe, for lowering a front portion of the bracket during independent movement of the front member after the sliding panel has been lowered at its rear portion and moved rearwardly.

11 Claims, 19 Drawing Sheets

SLIDING ROOF ASSEMBLY

BACKGROUND OF THE INVENTION

This invention relates to a sliding roof assembly capable of being installed in a vehicle such as an automobile. More particularly, the invention relates to a sliding roof assembly of the type in which the sliding panel is housed first by lowering the rear end of the sliding panel, then sliding the panel slightly in the direction in which it is to be housed, lowering the front end of the sliding panel and finally sliding the panel in the housing direction with both its front and rear ends being maintained in a horizontal attitude.

DESCRIPTION OF THE PRIOR ART

A sliding roof assembly referred to also as a sunroof assembly is mainly installed in the roof of an automobile and has a sliding panel for opening and closing an opening provided in the roof. The sliding panel is capable of being moved back and forth between a position in which it is housed and a position at which it closes the roof opening. The rear end of the sliding panel is pushed up (tilted) when it is located at the position for closing the roof opening. A typical example of such a sliding roof assembly is disclosed in the specification of Japanese Patent Laid-Open Publication No. 4-243623 (1992).

This example of the prior art is so adapted as to reduce the thickness of the sliding roof assembly. Specifically, at least front and rear elevating mechanisms are disposed between brackets on the panel side and linkage bodies on the side of guide rails. When the roof opening is opened fully (i.e., when the sliding panel is moved to the housing position), the front and rear ends of the panel are lowered simultaneously to place the panel in a horizontal attitude overall and then the panel is moved to the housing position horizontally. Thus, in this example of the prior art, the object of reducing the thickness of the sliding roof assembly is attained in the manner described above.

A sliding roof assembly usually is equipped with a wind deflecting panel or deflector. When the sliding panel is situated at the position at which it closes the opening in the roof, the wind deflecting panel is contacted by the panel, whereby its movement is restricted, and the wind deflecting panel is accommodated in the lower portion of the sliding panel. When the sliding panel is moved from the position at which it closes the roof opening to the housed position, the wind deflecting panel is no longer contacted by the sliding panel and, as a result, assumes a wind deflecting state in which it projects from the sliding panel. In other words, the wind deflecting panel is moved up and down by moving the sliding panel. Consequently, in order to lower the front and rear ends of the overall sliding panel simultaneously before the sliding panel is moved horizontally to the housed position in the example of the prior art described above, interference between the sliding panel and the wind deflecting panel must be avoided when the sliding panel is lowered. To accomplish this, it is required that enough space be provided in the direction of thickness at the position at which the sliding panel closes the roof opening.

Accordingly, if the prior art is applied to a sliding panel assembly fitted with the above-mentioned wind deflecting panel, it is difficult to reduce the thickness of the sliding roof assembly. Though this problem may be solved by using a wind deflecting panel that is independent of the sliding panel, a mechanism for raising and lowering the wind deflecting panel would be required. The result would be a wind deflecting panel of greater complexity.

SUMMARY OF THE INVENTION

Accordingly, an object of the present invention is to provide a sliding roof assembly that makes possible a reduction in thickness while allowing satisfactory movement of a wind deflecting panel.

To achieve the objects and in accordance with the purpose of the invention, as embodied and broadly described herein, a sliding roof assembly as provided that comprises a bracket for supporting a sliding panel, the sliding panel having a front portion and a rear portion, a driving rear shoe movably supported by a guide rail, a driven first front shoe movably supported by the guide rail, a driven second front shoe movably supported by the guide rail, a rear lift link coupled between the bracket and the driving rear shoe for lowering and raising the rear portion of the sliding panel, a front lift link coupled between the bracket and the driven second front shoe, means for transmitting a rear driving force, after lowering of the rear portion of the sliding panel, to the driven first and second front shoes whereby the first and second front shoes are moved rearwardly jointly and the bracket and sliding panel are moved rearwardly, means for temporarily stopping the joint rearward movement of the first and second driven shoes, and means coupled between the driven first front shoe and the bracket for lowering the front portion of the sliding panel during the temporary stoppage of the joint rearward movement.

The invention further provides a sliding roof assembly comprising a guide rail arranged along each side of an opening in a roof of a vehicle, a bracket for attaching a panel which opens and closes the opening, and elevating mechanisms disposed between the guide rail and the bracket for raising and lowering front and rear ends of the panel, wherein the elevating mechanism for raising and lowering the rear portion of the panel has a driving rear shoe free to move back and forth along the guide rail and coupled to a cable from a source of power, and a rear lift link pivoted on the bracket for turning in dependence upon movement of the driving shoe, and the elevating mechanism for raising and lowering the front portion of the panel has a driven first front shoe free to move back and fourth along the guide rail, a driven second front shoe coupled to the driven first front shoe via a first check block, a second check block having a front end pivotally supported on the driven second front shoe and a rear end provided with a stopper pin free to be inserted into and withdrawn from a hook groove in the driving shoe, and a front lift link having one end pivoted on the driven second front shoe and another end pivoted on the bracket, the front lift link having a part to be inserted into a cam groove provided in the driven front shoe.

The invention further provides a sliding roof assembly comprising a bracket for supporting a sliding panel, the sliding panel having a front portion and a rear portion, means for lowering the rear portion of the sliding panel and moving rearwardly the sliding panel, a driven front shoe, responsive to the means for lowering and moving, for moving rearwardly with the sliding panel, a front member responsive to the means for lowering and moving, for moving rearwardly with the sliding panel, means coupled between the front member and the driven front shoe for interrupting the rearward movement of the driven front shoe, and means coupled between the driven front shoe and the bracket for lowering the front portion of the panel during interruption of the rearward movement of the driven front shoe.

In accordance with the invention, driving force from the driving rear shoe is transmitted to the driven second front shoe, whence the driving force is transmitted to the driven first front shoe (front member) in such a manner that the transmission of force is controlled intermittently by a cam groove provided in the driven second front shoe. As a result, with the bracket's rear portion kept in a lowered attitude, the bracket is moved to the rear, after which it is possible to lower the front portion of the bracket.

Even if a wind deflector is added onto the front edge of the roof opening, the wind deflector is brought to a predetermined position during the rearward movement of the rear portion of bracket in the lowered attitude. This makes it possible to reduce the thickness of the assembly.

Other features and advantages of the present invention will be apparent from the following description taken in conjunction with the accompanying drawings, in which like reference characters designate the same or similar parts throughout the figures thereof.

DESCRIPTION OF THE PREFERRED EMBODIMENTS

The construction of a sliding roof assembly embodying the present invention will now be described with reference to the drawings.

Figure 1:
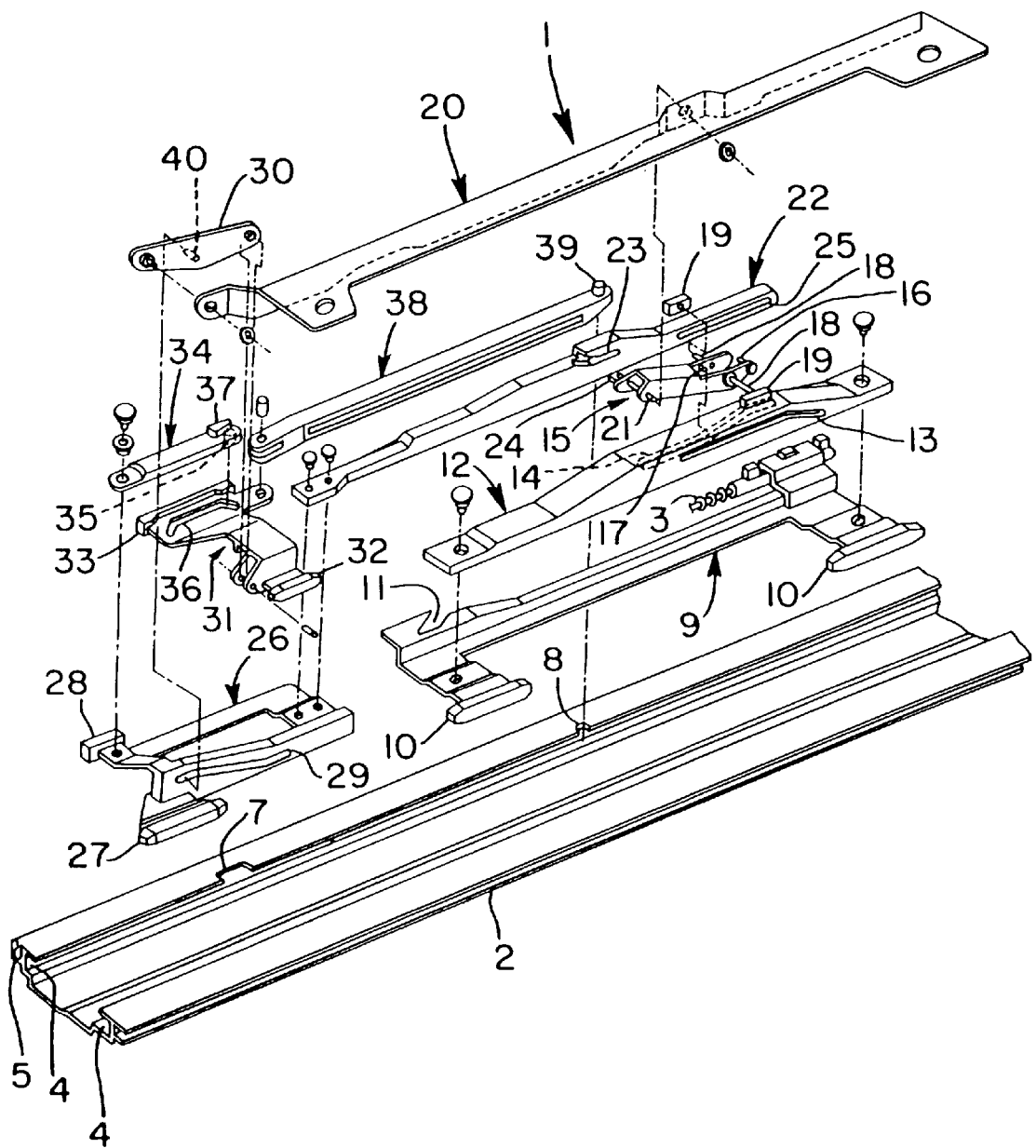
FIG. 1 is an exploded perspective view showing a sliding roof assembly according to an embodiment of the present invention.
Figure 2:
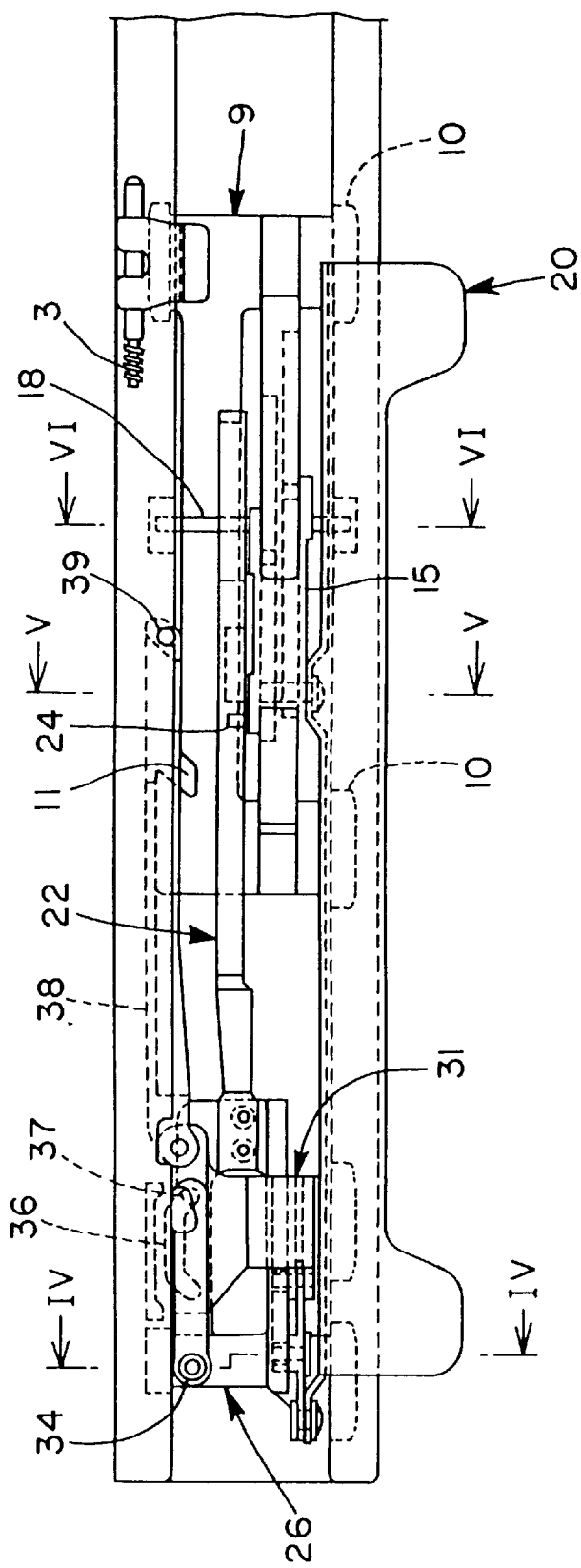
FIG. 2 is a plan view illustrating a sliding panel in a fully closed state.

FIG. 1 illustrates a mechanism, which constitutes part of the sliding roof assembly of the invention, disposed on one side of the opening in the roof of an automotive vehicle. An identical mechanism that is symmetrical to this mechanism is disposed on the opposite side of the opening and need not be described.

As shown in FIG. 1, a sliding roof assembly 1 according to the invention includes a guide rail 2 whose longitudinally extending sides are provided with respective guide grooves 4, 4 for accommodating front and rear shoes, described later. One longitudinally extending side of the guide rail 2 is provided with a guide groove 5 for accommodating a cable 3 coupled to a source of power. The side wall of the guide groove 5 accommodating the cable 3 is provide with spaced first and second stopper holes 7, 8. A driving rear shoe 9, which is connected to the distal end of the cable 3, has spaced front and rear shoes 10, 10 received in one guide groove 4, and a hook groove 11 provided at a forward position. Front and rear portions of an elongated, slender guide block 12 are fastened by screws to front and rear portions of the driving rear shoe 9. The guide block 12 has cam grooves 13, 14 in its inner and outer side faces.

A rear lift link 15, which has a generally inverted U-shaped cross section and is so arranged as to transversely span the guide block 12, has a first pin 16 inserted into the inner cam groove 13, a second pin 17 inserted into the outer cam groove 14, shafts 18, 18 extending inwardly and outward from both sides thereof, guide shoes 19, 19 pivotally supported on the respective shafts 18, 18 and received in the guide grooves 4, 4, a support pin 21 pivotally supporting a bracket 20 that is for attaching a glass panel, described later, and a hook pin 24 freely engageable with a hook groove 23 of a connector 22, described later. The rear lift link 15 is free to turn about the shafts 18, 18.

The connector 22, which is elongated longitudinally of the guide rail, has a rear portion provided with a slender, elongated slot 25 through which one of the shafts 18 is passed, and a front portion fastened by screws to the rear portion of a driven first front shoe 26.

The driven first front shoe 26 has a front shoe 27 and a guide shoe 28 received in the guide grooves 4, 4, and is provided with a cam groove 29 in the side face thereof.

A front lift link 30 is pivotally supported on the front end of the bracket 20, and a guide pin 40 of the front lift link 30 is inserted into the cam groove 29 of the driven first front shoe 26. The rear portion of the front lift link 30 is fastened to a driven second front shoe 31 by a pin.

The driven second front shoe 31 has a rear shoe 32 and a guide shoe 33 received in the guide grooves 4, 4, as well as a cam groove 36 for receiving a guide pin 35 of a first check block or lever 34 whose one end is pivotally supported on the driven first front shoe 26. The rear portion of the first check block 34 has a first stopper 37 freely engageable with the first stopper hole 7 of the guide rail 2.

A slender, elongated second check block 38, which is arranged so as to be free to slide back and forth inside the guide groove 4 on the outer side, is pivotally supported on the driven second front shoe 31. The second check block 38 has a stopper pin 39 freely engageable with the second stopper hole 8 of the guide rail 2 and freely engageable with the hook groove 11 of the driving rear shoe 9.

The movement of the sliding roof assembly 1 from the position at which it closes the roof opening to the position at which it is housed, as well as the operation for tilting the sliding roof, will be described below. First, the path along which the driving force is transmitted will be described.

When the cable 3 moves the driving rear shoe 9 to the right in FIG. 1, relative movement is produced between the guide block 12 and the rear lift link 15, the first and second pins 16, 17 slide along the inner and outer cam grooves 13, 14 and the rear portion of the bracket 20 to which the glass panel is attached is eventually pushed down. Further rearward movement of the driving rear shoe 9 causes the hook groove 11 to engage with the second stopper pin 39, thereby withdrawing the second stopper pin 39 from the second stopper hole 8 so that both front shoes 26, 31 are retracted while being dragged. The first stopper 37 eventually is inserted into the first stopper hole 7 and, at the same time, the front portion of the bracket 20 is lowered (at which time movement of the driven first front shoe 26 ceases and only the driven second front shoe 31 moves to the rear). When the front portion of the bracket 20 descends, i.e., when the bracket 20 becomes horizontal, the first stopper 37 separates from the first stopper hole 7 and, owing to engagement of the hook pin 24 with the hook groove 23, the driven first front shoe 26 moves to the housed position in sync with the movement of the driven second front shoe 31 due to the engagement of the stopper pin 39 with the hook groove 11.

The positions of the various members when an opening 41 in the roof of a vehicle has been completely closed by a sliding panel 42 will now be described with reference to FIGS. 2 through 6.

Figure 3:
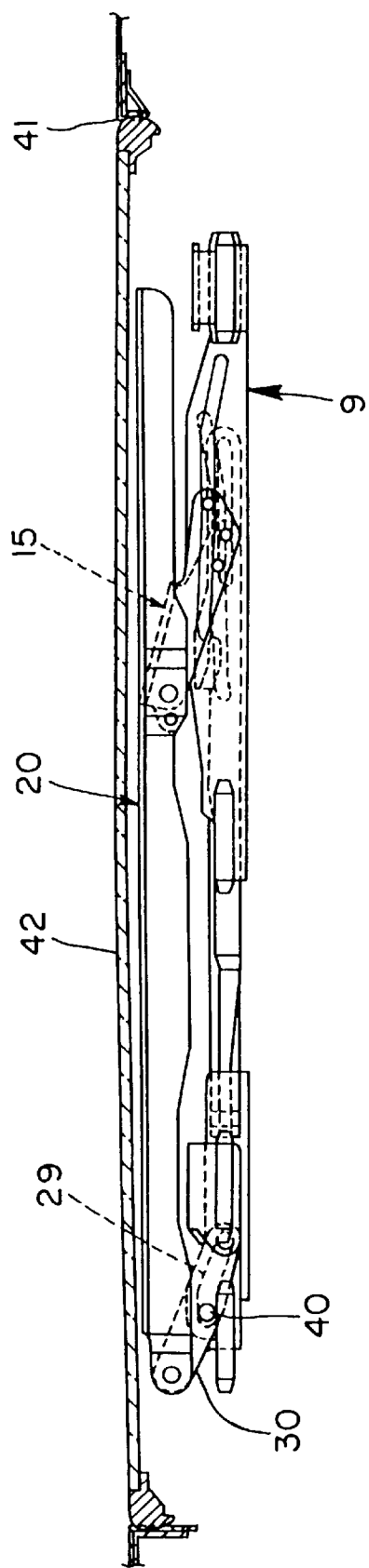
FIG. 3 is a side view showing the state of the assembly illustrated in FIG. 2.
Figure 4:
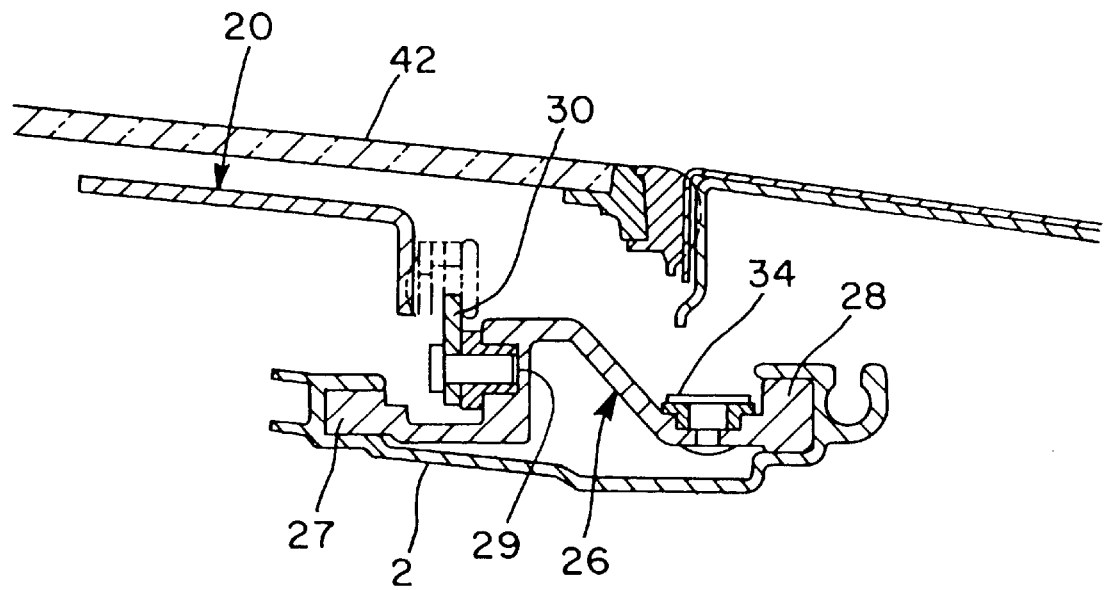
FIG. 4 is a sectional view taken along line IV—IV of FIG. 2.
Figure 5:
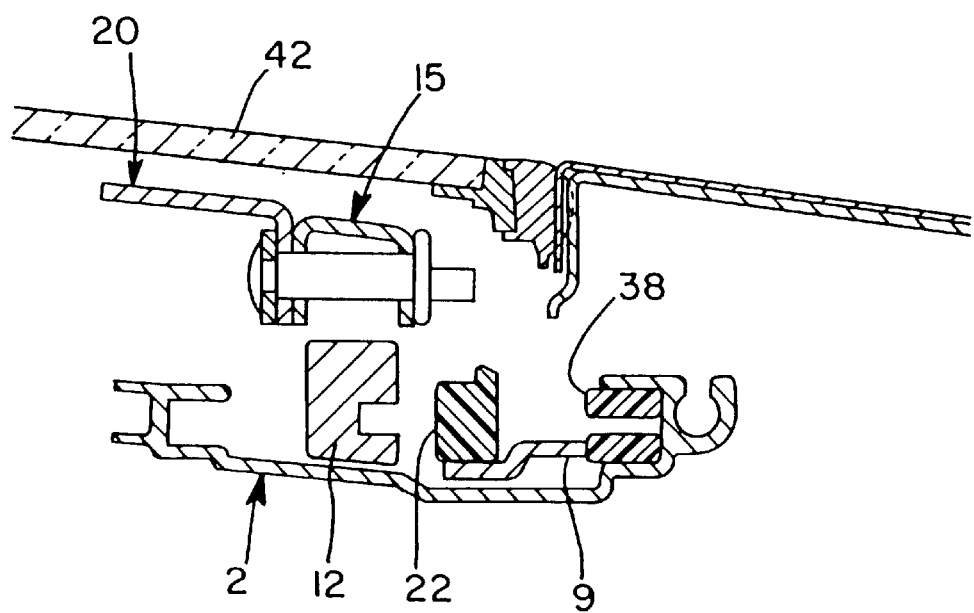
FIG. 5 is a sectional view taken along line V—V of FIG. 2.
Figure 6:
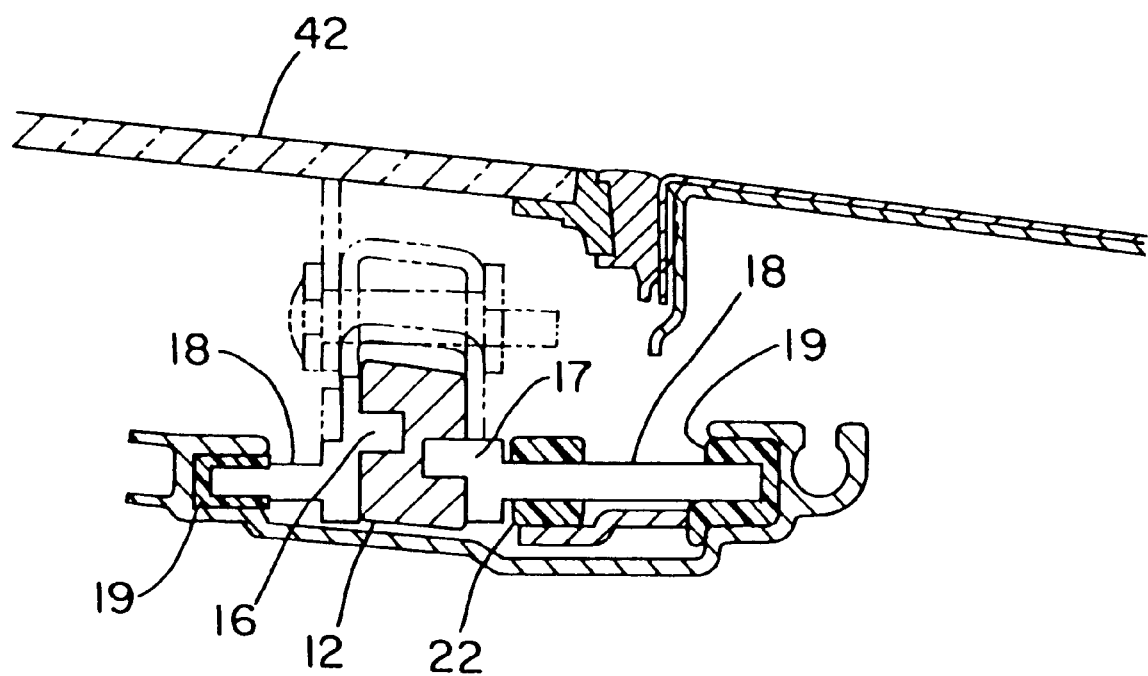
FIG. 6 is a sectional view taken along line VI-VI of FIG. 2.

When the opening 41 is in the fully closed state, the rear lift link 15 is in a state in which it is tilted about the shaft 18, with its left end being slightly higher than its right end as viewed in FIG. 3. The pins 16, 17 are situated in the horizontal portions of the cam grooves 13, 14, and a guide pin 40 of the front lift link 30 is situated in the front end of the cam groove 29. The hook groove 11 waits in front of the second stopper pin 39, and the second stopper pin 39 is situated in the stopper hole 8. The stopper 37 of the first check block 34 is situated in front of the stopper hole 7.

Figure 7:
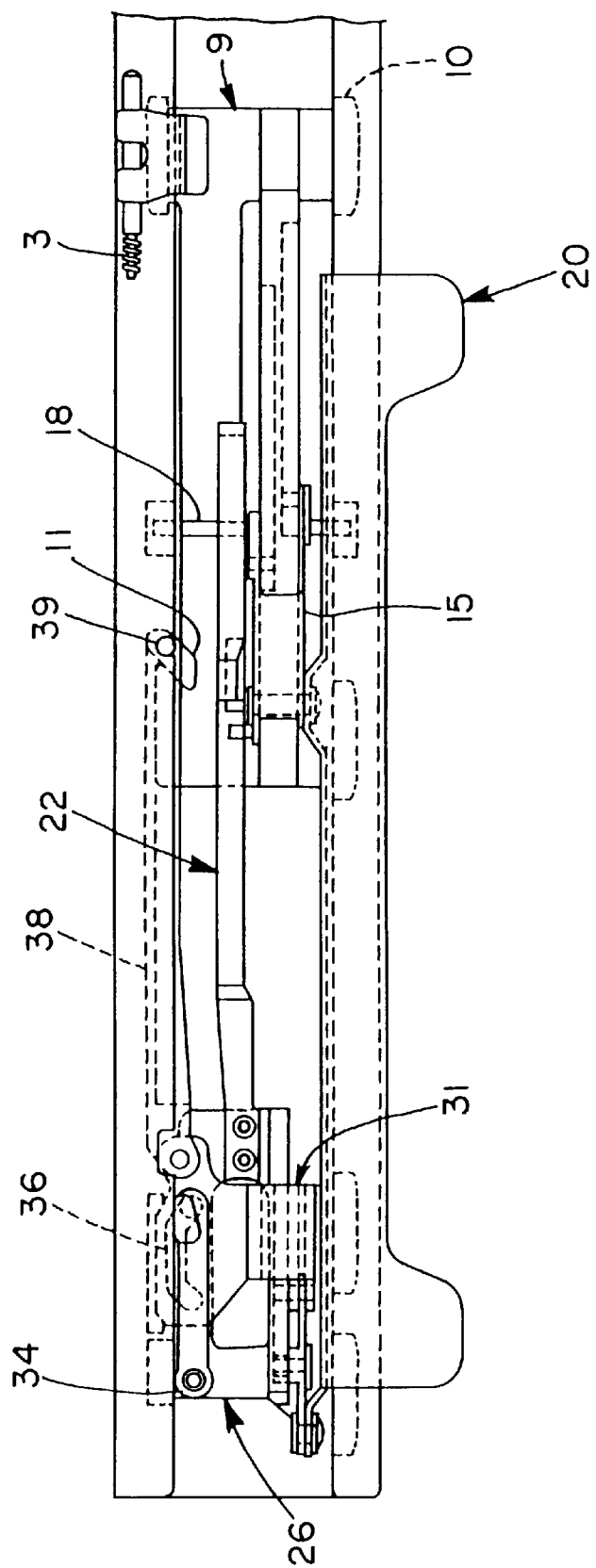
FIG. 7 is a plan view showing the rear end of the sliding panel in the lowered state.
Figure 8:
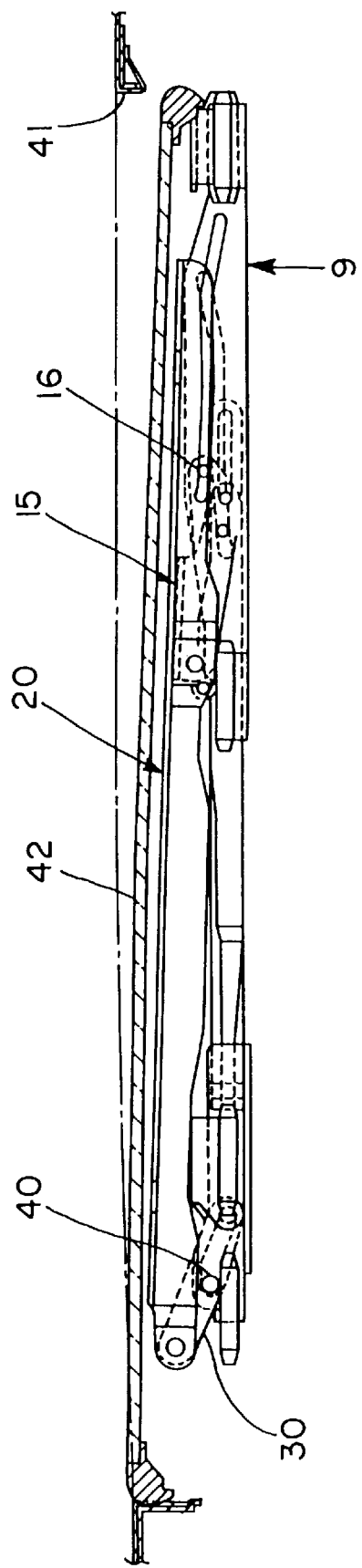
FIG. 8 is a side view showing the state of the assembly illustrated in FIG. 8.

FIGS. 7 and 8 show the rear end of the bracket 20 in the lowered state. Rearward movement of the driving rear shoe 9 by the cable 3 causes the pins 16, 17 to slide in the cam grooves 13, 14, whereby only the rear portion of the bracket 20 is lowered. The hook groove 11 engages with the second stopper pin 39 and the pin 39 is extracted from the stopper hole 8. Under these conditions only the driving rear shoe 9 and the guide block 12 integral with it move to the rear. The engagement of the hook groove 11 with the second stopper pin 39 makes it possible for the driving force from the cable 3 to be transmitted to the driven second front shoe 31 via the second check block 38.

Figure 9:
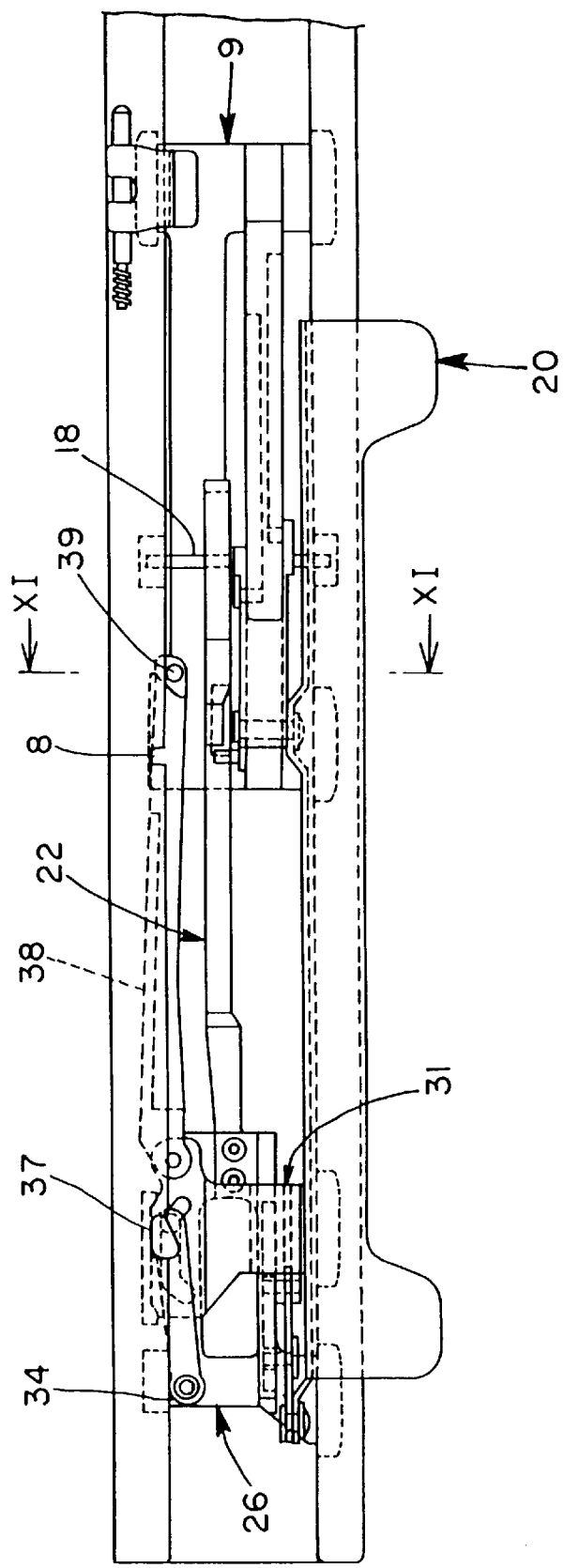
FIG. 9 is a plan view showing the sliding panel in a state in which it has been slid slightly to the rear.
Figure 10:
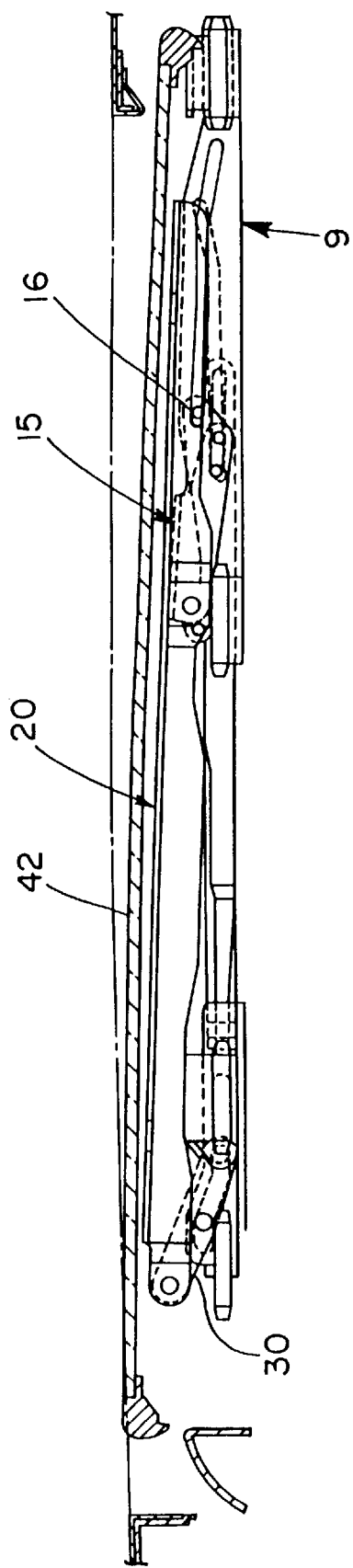
FIG. 10 is a side view showing the state of the assembly illustrated in FIG. 9.
Figure 11:
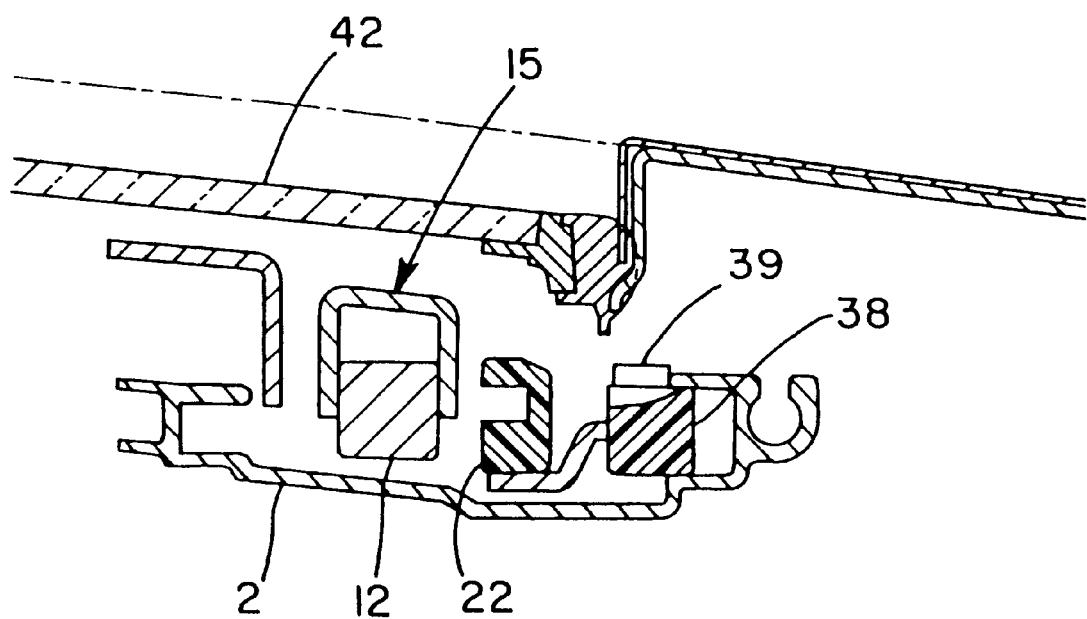
FIG. 11 is a sectional view taken along line XI—XI of FIG. 9.

The most important feature of the illustrated embodiment is shown in FIGS. 9 through 11. Though the driving force from the cable 3 is transmitted to the second check block 38, the guide pin 35 of the first check block 34 is situated in the rearward L-shaped portion of the cam groove 36 and, hence, the driving force is transmitted to the driven first front shoe 26 via the first check block 34. Thus, the driving rear shoe 9 and the driven first and second front shoes 26, 31 are moved rearward in similar fashion. In other words, the bracket 20 is moved to the rear while its rear portion is in the lowered attitude. Such movement creates enough space to allow upward movement of a wind deflector. In addition, the stopper pin 37 is made to oppose the stopper hole 7.

Figure 12:
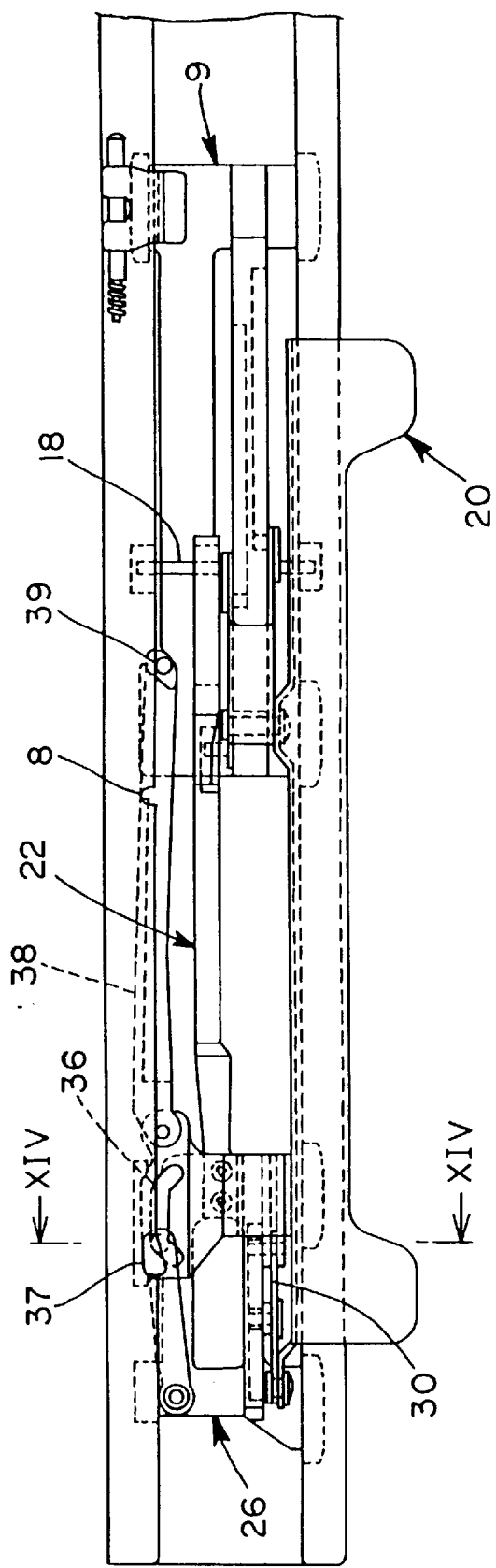
FIG. 12 is a plan view showing the sliding panel in a state in which its front end has been lowered.
Figure 13:
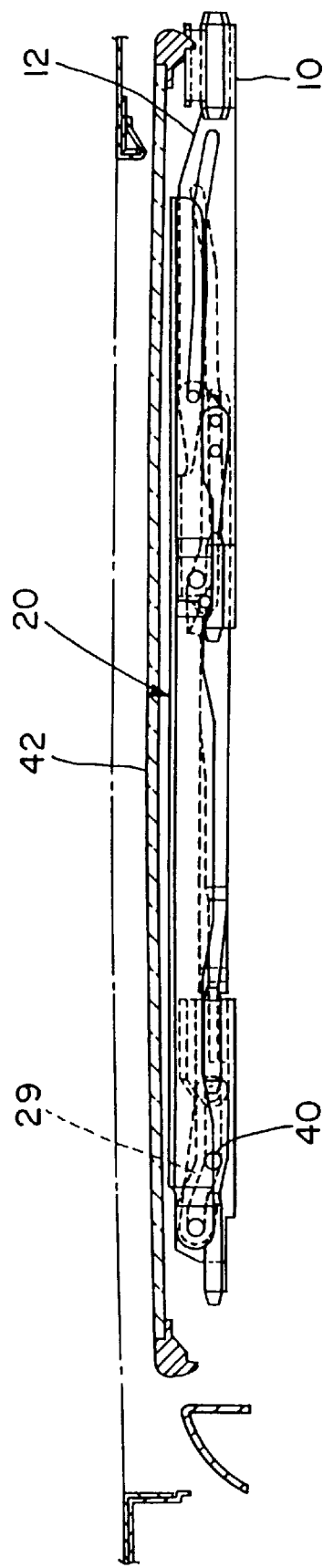
FIG. 13 is a side view showing the state of the assembly illustrated in FIG. 12.
Figure 14:
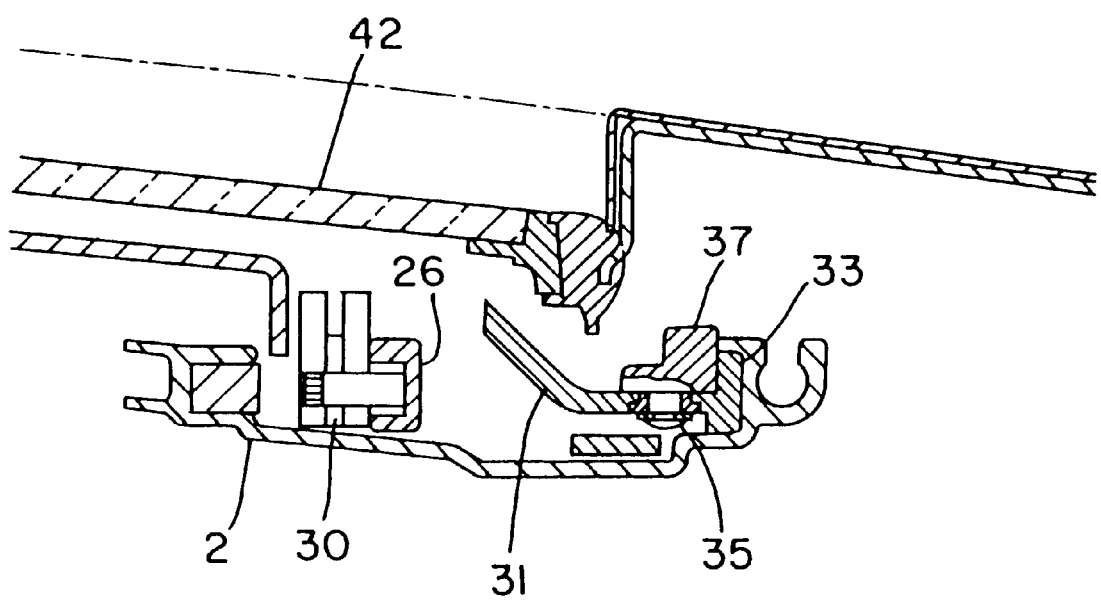
FIG. 14 is a sectional view taken along line XIV—XIV of FIG. 12.
Figure 15:
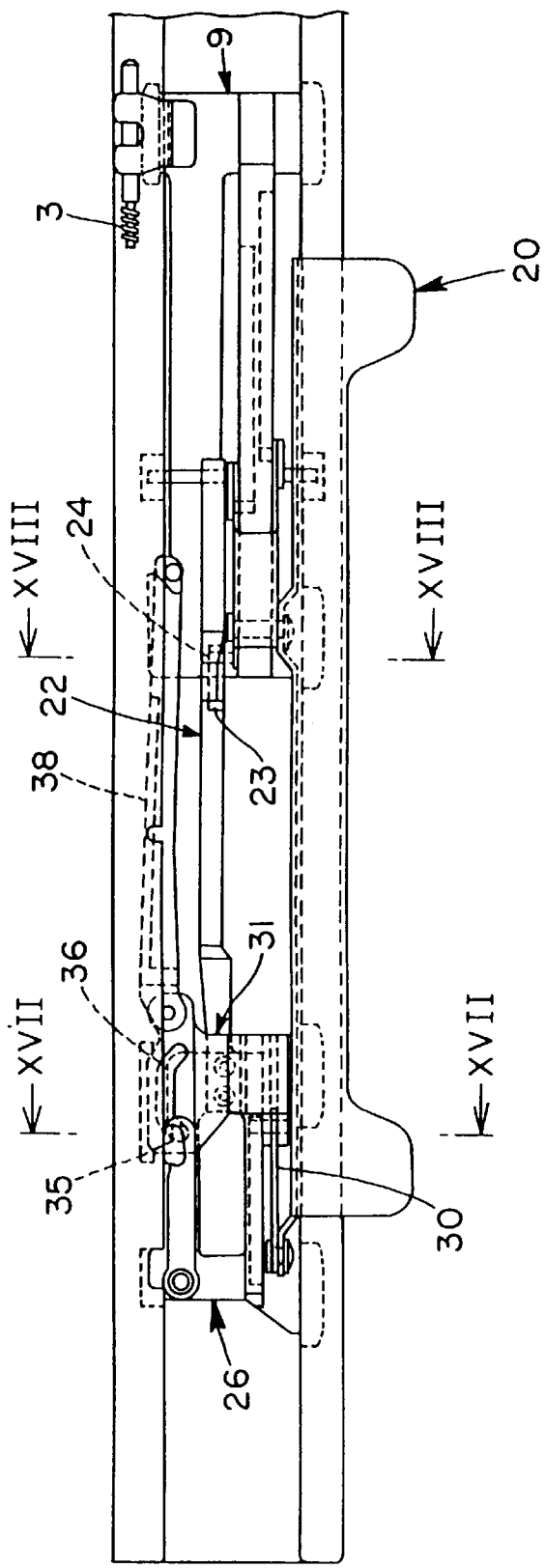
FIG. 15 is a plan view showing the sliding panel in a state in which it is moved back and forth.
Figure 16:
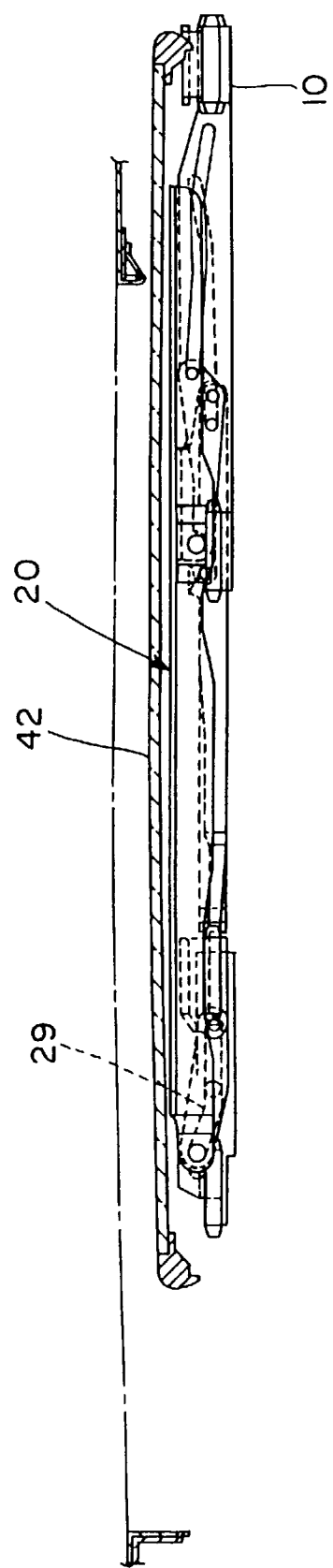
FIG. 16 is a side view showing the state of the assembly illustrated in FIG. 15.
Figure 17:
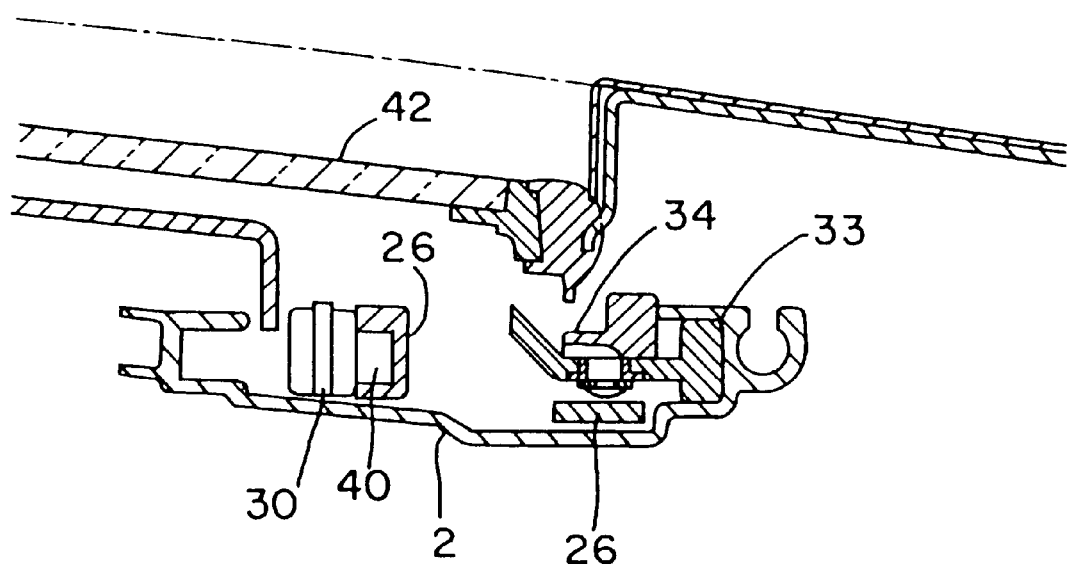
FIG. 17 is a sectional view taken along line XVII—XVII of FIG. 15.
Figure 18:
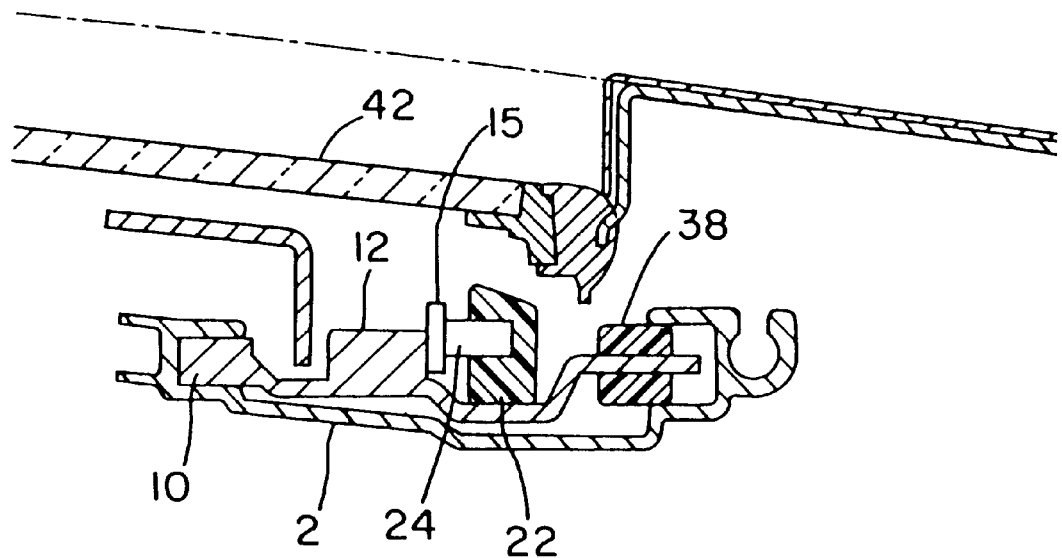
FIG. 18 is a sectional view taken along line XVIII—XVIII of FIG. 15.

FIGS. 12, 13 and 14 show the front end of the bracket 20 in the lowered state. The first stopper 37 is located in the stopper hole 7, the guide pin 35 is situated in the linear portion of the cam groove 36, and rearward movement of the driving rear shoe 9 causes the driven second front shoe 31 to move relative to the driven first front shoe 26. This relative movement causes the guide pin 40 of the front lift link 30 to move along the cam groove 29 of the driven first front shoe 26 and lowers the front portion of the bracket 20, which is pivotally supported on the front lift link 30, as a result of which the bracket 20 assumes the horizontal attitude.

Movement of the horizontal bracket 20 to the housed position is illustrated in FIGS. 15 through 18. The guide pin 35 is situated in the forward L-shaped portion of the cam groove 26 and movement of the driven second front shoe 31 is transmitted directly to the driven first front shoe 26. Since the first stopper 37 is protruding from the stopper hole 7, both front shoes 26, 31 move rearward together. At this time the pin 21 engages with the hook groove 23 of the connector 22, the movement of the driving rear shoe 9 is transmitted directly to the driven first front shoe 26 via the connector 22 as well, and the front shoes 26, 31 are moved rearward in reliable fashion with the transmission of the driving force via the second check block 38.

Figure 19:
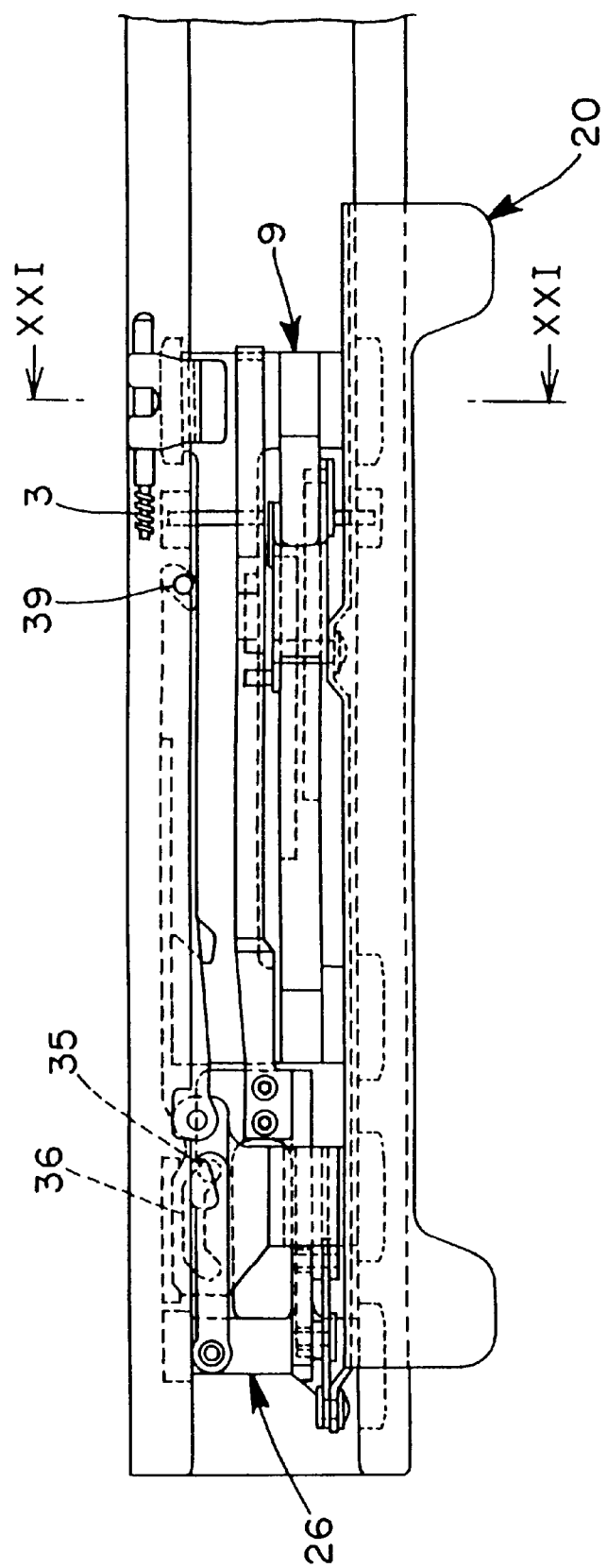
FIG. 19 is a plan view showing the sliding panel in a state in which its rear end has been tilted up.
Figure 20:
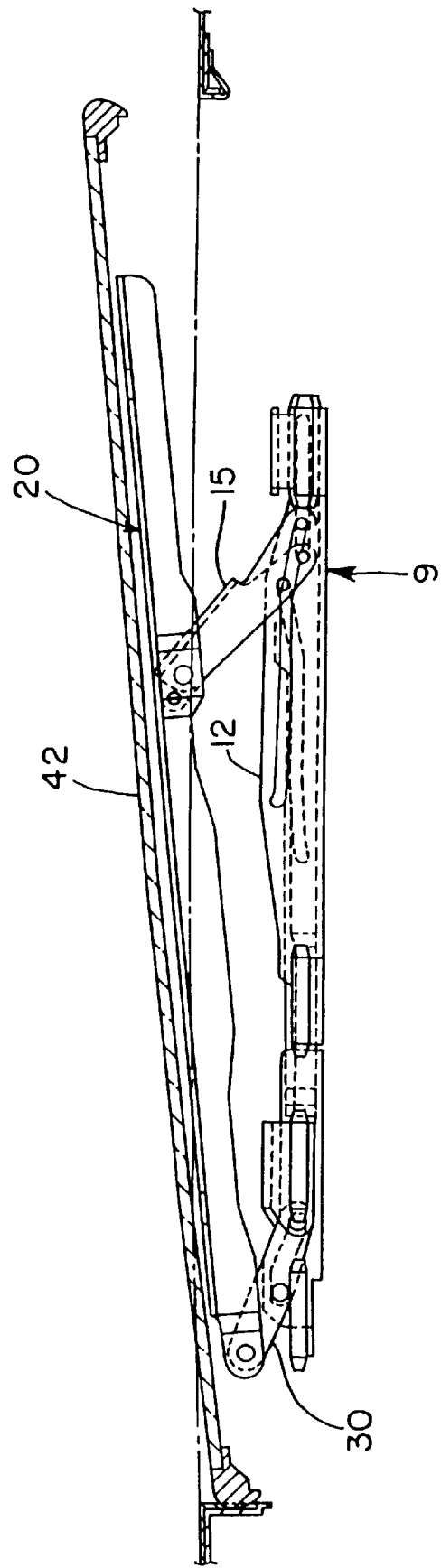
FIG. 20 is a side view showing the state of the assembly illustrated in FIG. 19.
Figure 21:
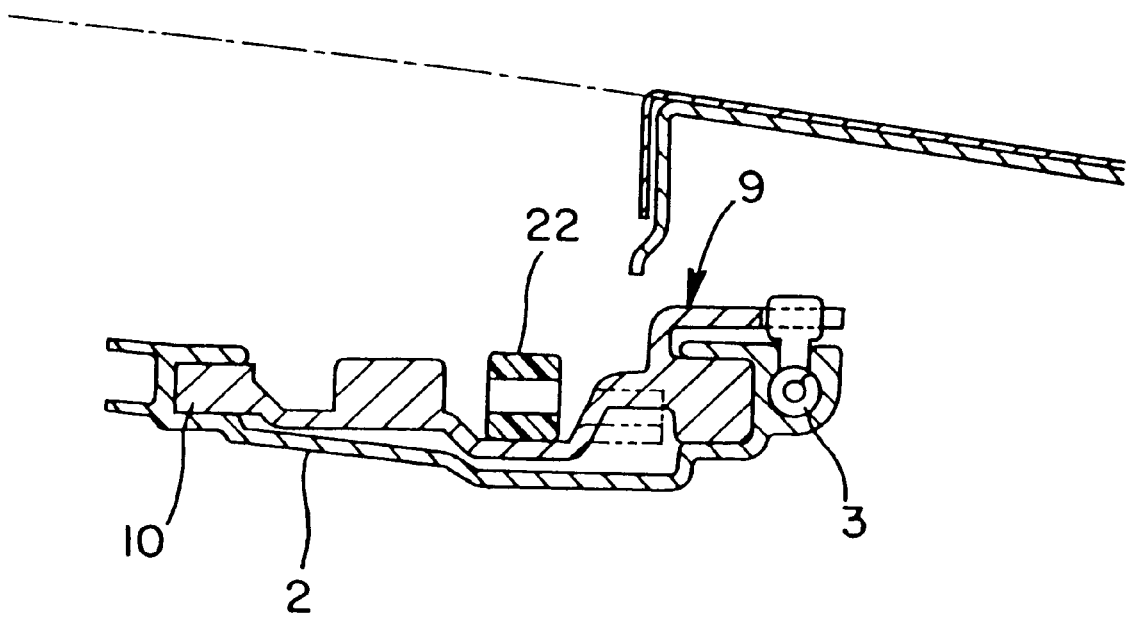
FIG. 21 is a sectional view taken along line XXI—XXI of FIG. 19.

A tilt-up operation will be described with reference to FIGS. 19 through 21. When the cable 3 is pulled forward from the state shown in FIGS. 2 and 3, only the driving rear shoe 9 is moved forward so that the pins 16, 17 of the rear lift link 15 move along the cam grooves 13, 14. As a result, the rear portion of the bracket 20 rises so that the bracket 20 assumes the tilted state.

In the illustrated embodiment, the movement of the panel 42 from the fully closed position to the housed position and the tilt-up operation of the panel 42 are described. Since the movement of the panel 42 from the housed position to the fully closed position and from the tilt-up position to the fully closed position are performed in a manner that is the reverse of the foregoing, these operations need not be described.

Thus, in accordance with the present invention, a wind deflector may be moved to the rear with the rear portion of the sliding panel being placed in a lowered state, after which the sliding panel is placed in a horizontal attitude and them moved to the rear. This makes it possible to reduce the thickness of the sliding roof assembly without enlarging the size of assembly as a result of the wind deflector.

As many apparently widely different embodiments of the present invention can be made without departing from the spirit and scope thereof, it is to be understood that the invention is not limited to the specific embodiments thereof except as defined in the appended claims.

What is claimed is:

1. A sliding roof assembly comprising:
   a bracket for supporting a sliding panel, said sliding panel having a front portion and a rear portion;
   a driving rear shoe movably supported by a guide rail;
   a driven first front shoe movably supported by said guide rail;
   a driven second front shoe movably supported by said guide rail;
   a rear lift link pivotally coupled to said bracket and said driving rear shoe for lowering and raising the rear portion of said sliding panel;
   a front lift link pivotally coupled to said bracket and said driven second front shoe;
   means for transmitting a rear driving force, after lowering of the rear portion of said sliding panel, to said driven first and second front shoes whereby said first and second front shoes are moved rearwardly jointly and said bracket and sliding panel are moved rearwardly;

means for temporarily stopping joint rearward movement of said first and second driven shoes, and the front lift having a guide pin engaging a cam groove of the first front shoe for lowering the front portion of said sliding panel during the temporary stoppage of said joint rearward movement.

2. The sliding roof assembly according to claim 1, wherein said means for temporarily stopping joint rearward movement includes a cam groove in said driven second front shoe, a check lever, one end of which is pivotally supported by said driven first front shoe, and a pin that moves inside the cam groove.

3. The sliding roof assembly according to claim 2, wherein said means for transmitting includes a check block, and said check block and said check lever have respective stopper pins freely engageable with and disengageable from respective stopper holes of said guide rail.

4. A sliding roof assembly comprising:

a guide rail arranged along each side of an opening in a roof of a vehicle;

a bracket for attaching a panel which opens and closes the opening; and elevating mechanisms disposed between said guide rail and said bracket for raising and lowering front and rear ends of the panel;

said elevating mechanism for raising and lowering the rear portion of the panel having a driving rear shoe free to move back and forth along said guide rail and coupled to a cable from a source of power, and a rear lift link pivotably supported on said bracket for turning in dependence upon movement of the driving shoe; and said elevating mechanism for raising and lowering the front portion of the panel having a driven first front shoe free to move back and fourth along said guide rail, a driven second front shoe coupled to said driven first front shoe via a first check block, a second check block having a front end pivotally supported on said driven second front shoe and a rear end provided with a stopper pin free to be inserted into and withdrawn from a hook groove in said driving shoe, and a front lift link having one end pivotably supported on said driven second front shoe and another end pivotably supported on said bracket;

said front lift link having a part to be inserted into a cam groove provided in said driven first front shoe.

5. The sliding roof assembly according to claim 4, wherein said driven second front shoe has a cam groove, and said first check block is pivotally supported by said driven first front shoe and has a guide pin inserted into said cam groove of said driven second front shoe.

6. The sliding roof assembly according to claim 5, wherein stoppers of said first and second check blocks are free to engage with and disengage from respective ones of spaced stopper holes of said guide rail.

7. The sliding roof assembly according to claim 4, further comprising a connector interposed between said driven first front shoe and said driving rear shoe.

8. A sliding roof assembly comprising:

a bracket for supporting a sliding panel, the sliding panel having a front portion and a rear portion;

means for lowering the rear portion of the sliding panel and moving rearwardly the sliding panel;

a first driven front shoe, connected to the means for lowering and moving, for moving rearwardly with the sliding panel;

a second driven front shoe, connected to the means for lowering and moving, for moving rearwardly with the sliding panel;

means for interrupting the rearward movement of the first driven front shoe while maintaining the rearward movement of the second driven front shoe; and means connecting the second driven front shoe and the bracket for lowering the front portion of the sliding panel during interruption of the rearward movement of the first driven front shoe.

9. The sliding roof assembly according to claim 8, wherein the means for interrupting includes a cam groove in the front member, a check lever pivotally supported by the driven front shoe and having a pin that moves inside the cam groove, and a stopper pin that moves in response to pivoting of the check lever.

10. The sliding roof assembly according to claim 9, further comprising a guide rail, a stopper hole on said guide rail engageable and disengageable by the stopper pin, and wherein the cam groove has forward and rearward L-shaped portions for moving the stopper pin into engagement with and disengagement from the stopper hole.

11. A sliding roof assembly comprising:

a bracket for supporting a sliding panel, said sliding panel having a front portion and a rear portion;

a driving rear shoe movably supported by a guide rail;

a driven first front shoe movably supported by said guide rail;

a driven second front shoe movably supported by said guide rail;

a rear lift link coupled to said bracket and said driving rear shoe for lowering and raising the rear portion of said sliding panel;

a front lift link coupled to said driven first front shoe and linking said bracket and said driven second front shoe;

means for transmitting a rear driving force, after lowering of the rear portion of said sliding panel, to said driven first and second front shoes whereby said first and second front shoes are moved rearwardly jointly and said bracket and sliding panel are moved rearwardly;

means for temporarily stopping joint rearward movement of said first and second driven shoes, and said front lift link lowering the front portion of said sliding panel during the temporary stoppage of said joint rearward movement.

\* \* \* \* \*